Aug. 11, 1942.   H. H. GOTBERG   2,292,440
BROACHING MACHINE
Filed Dec. 7, 1940   2 Sheets-Sheet 1

INVENTOR
Harry H. Gotberg.
BY
Harness, Dickey & Pierce.
ATTORNEYS.

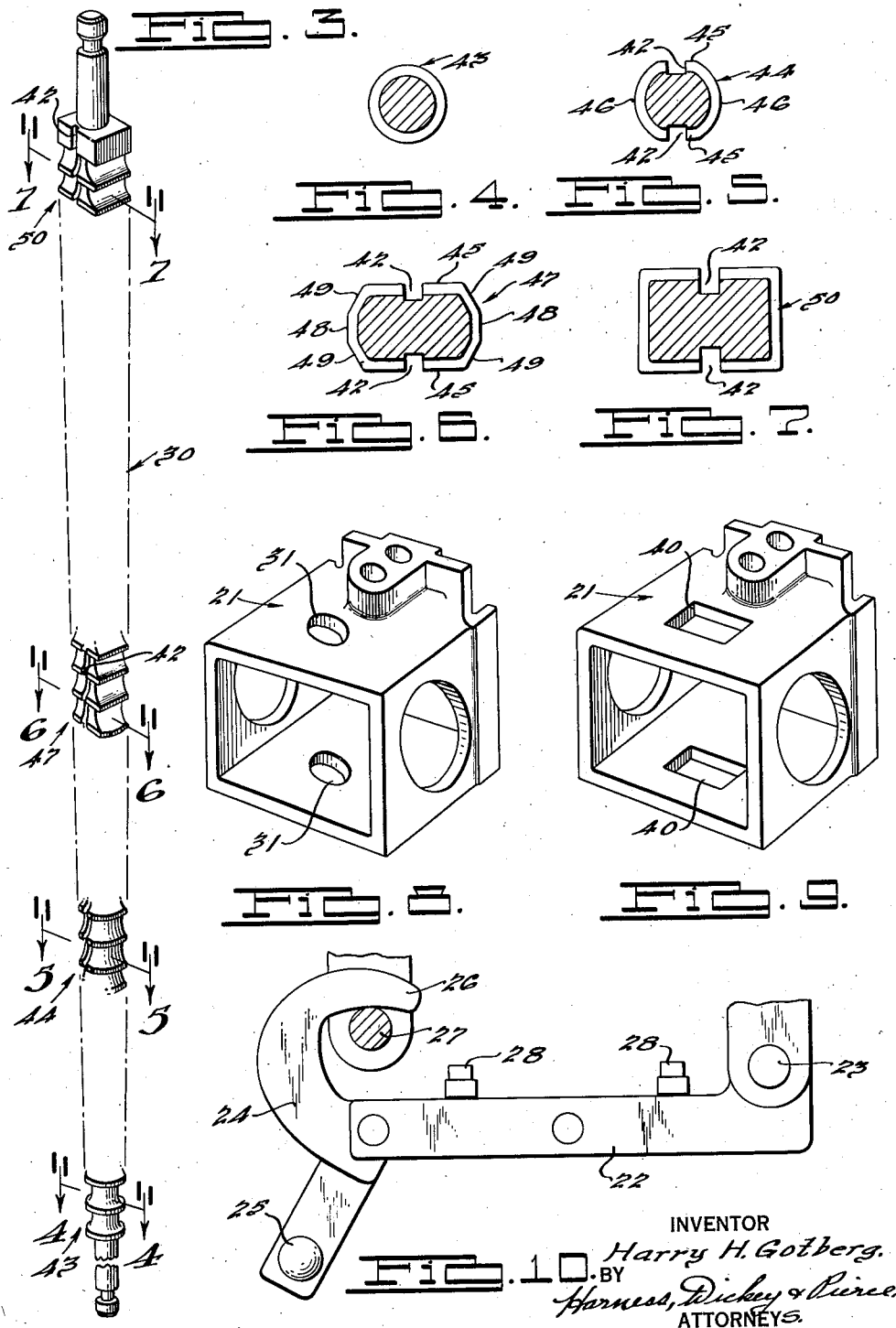

Patented Aug. 11, 1942

2,292,440

UNITED STATES PATENT OFFICE 2,292,440

BROACHING MACHINE

Harry H. Gotberg, Detroit, Mich., assignor to Colonial Broach Company, Detroit, Mich., a corporation of Delaware Application December 7, 1940, Serial No. 368,973

8 Claims. (Cl. 90—33)

The present invention relates to broaching machines and broaching tools and particularly to a novel means for guiding pull broaches during the broaching stroke.

It is a well recognized fact that pull broaches have a tendency to drift laterally during their cutting stroke, particularly when operating in castings. This is due to unequal hardness of the material or sharpness of the broach teeth, either of which tends to force the broach sideways in the opening being broached and throws the location of the opening to one side of its intended location. Moreover, if the original bored or cast hole is off-center, it will tend to hold the broach off-center with the result that the final opening is not properly located. In some cases it is necessary to locate broached openings very accurately with respect to the workpiece and, therefore, this side drift or off-center condition is often a serious defect.

Accordingly, it is the general object of the invention to provide means to guide a pull broach during the cutting stroke in order to eliminate side drift of the broach with respect to the desired final location of the broached opening.

More specifically it is an object of the present invention to provide a guiding means for a pull broach which is effective throughout substantially full trailing length of the broach.

Another object is to provide an improved form of pull broach adapted to co-operate with the guiding means of the type here involved.

Another object of the invention is to provide means for ensuring that the broach guiding means will be accurately aligned with the workpiece.

Other objects and advantages of the invention will become apparent from the following specification, the accompanying drawings, and the appended claims.

In the drawings:

Fig. 3 is a perspective view with parts broken away showing one embodiment of a broaching tool in accordance with the present invention;

Figures 1, 2:
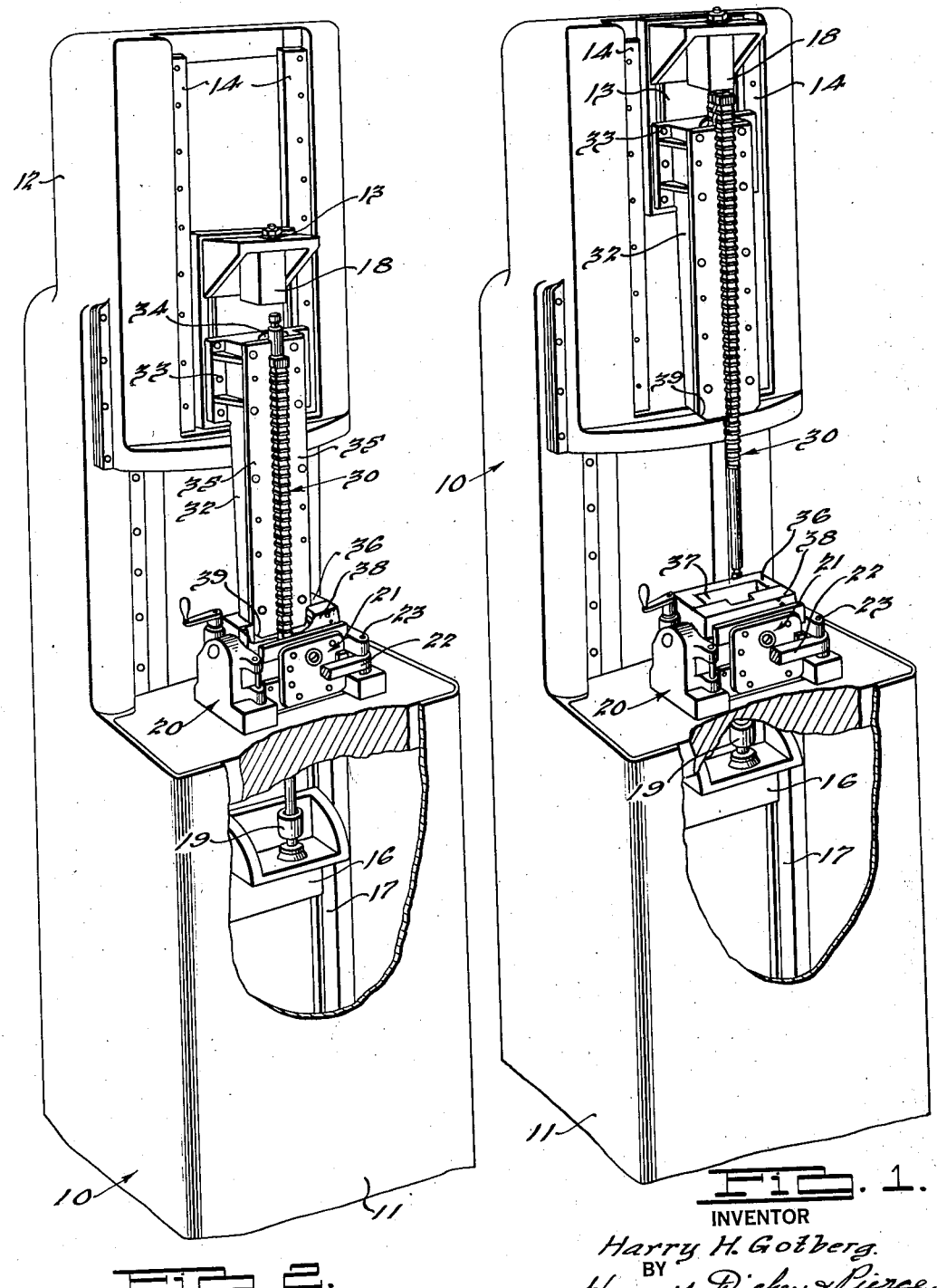
Figure 1 shows a general perspective view of a pulldown broaching machine equipped with the novel broach and broach guiding means of the present invention with the parts in their starting position.
Fig. 2 is a view similar to Fig. 1 showing the position of the parts during the broach cutting stroke.

Figs. 4, 5, 6, and 7 are sectional views taken through the broach of Fig. 3 at the section lines 4—4, 5—5, 6—6, and 7—7, Fig. 8 is a perspective view of one possible form of workpiece prior to the broaching operation;

Fig. 9 is a view of the workpiece upon completion of the broaching operation; and Fig. 10 is a fragmentary view showing a portion of the means for clamping the work in the work fixture of the machine.

The present invention may be applied to any conventional form of pull broaching machine, but in the drawings it is illustrated in conjunction with a vertical pull-down broaching machine of more or less conventional form. The machine as illustrated comprises a frame indicated generally at 10 which includes the usual supporting base 11 and an upright portion 12 mounted thereon. A slide, a portion of which appears in the drawings and is indicated 13, is mounted in suitable ways 14 at the upper portion of the machine and is adapted to reciprocate vertically under the influence of an hydraulic cylinder or other conventional means not shown. The lower portion of the machine is provided with a second slide 16 also mounted in ways 17 for vertical sliding movement under the influence of a second hydraulic cylinder or other conventional means. Slide 13 has fixedly secured thereto in the usual manner a broach handling chuck 18 which is adapted to grip the upper or trailing end of the broach, while similarly secured to the slide 16 is a pull chuck 19 adapted to grip the lower or forward end of the broach.

Mounted upon the bed of the machine in the usual fashion is a work supporting and clamping fixture indicated generally at 20. This fixture, in accordance with the usual practice, is especially designed to receive and locate the workpiece in accurate position with respect to the path of travel of the broach. The workpiece chosen for purposes of illustration is in the form of a casting 21 illustrated in greater detail in Figs. 8 and 9. The work holding fixture is provided with a clamping arm 22 pivoted at one end on a pin 23 and adapted to swing into clamping relation with respect to the workpiece 21. Any suitable form of latching device, such as the pivoted keeper 24 shown in Fig. 10, may be utilized to clamp the arm 22 against the work. The pivoted keeper 24 is provided with an upstanding operating handle 25 and has a hooked end portion 26 adapted to engage behind a pin 27 on the work fixture. A pair of work locating buttons 28 are provided on the inner surface of the arm 22 to engage the work, as best shown in Fig. 10.

In operation, the machine passes through a complete cycle of broach operating movements from the position shown in Fig. 1 as follows: First, the slide 13 moves downwardly carrying the chuck 18 and the broach, which is indicated generally at 30, downwardly, thereby projecting the lower end of the broach through the aligned preformed openings 31 in the workpiece (see Fig. 8) and into the pull chuck 19. Thereupon, the slide 13 stops in its lowermost position shown in Fig. 2 and the slide 16 with the pull chuck 19 and broach 30 move downwardly to effect a broaching stroke. The broaching stroke is completed when the entire broach is passed through the workpiece. The machine then stops and the now finished workpiece is removed from the work holding fixture by the operator. Upon removal of the workpiece the machine is started on the return portion of the cycle which involves first an upward movement of the slide 16 and pull head 19, resulting in a return of the broach to the chuck 18, followed by an upward movement of the slide 13 and chuck 18 which retracts the broach 30 into the position shown in Fig. 1, in which it is ready to repeat the cycle.

Machines having the above described cycle of operation are conventional and in the usual case the movement of the slides 13 and 16 is effected by hydraulic cylinders under the control of a hydraulic circuit which more or less automatically effects the necessary sequence of operation. Particular means for operating the slides being conventional or of any desired form constitutes no part of the present invention and therefore is not illustrated and described in detail.

In accordance with the present invention, an elongated broach guiding member 32 is fixed to the tool handling slide 13 in any suitable manner as by cap screws 33. The guiding member projects downwardly in parallel relation to the broach and is provided with a longitudinal half circular recess 34 adapted to receive a portion of the broach, as best shown in Figs. 1 and 2. In the particular form of device illustrated in the drawings, the member 32 projects downwardly a substantial distance below its point of connection to the slide 13 in order that its lower end will reach approximately to the workpiece when the slide 13 is in its lowermost position. Secured by cap screws or any other suitable means to the front face of the member 32 are a pair of guide bars 35 which project inwardly over a portion of the longitudinal recess 34 and are adapted to fit within specially provided grooves in the broaching tool for the purpose of maintaining the tool in proper alignment during the broach cutting stroke.

In order to prevent any misalignment of the guide member 32 and the guide bars 35 with respect to the workpiece, means are provided for engaging and aligning the member 32 with respect to the workpiece when the member 32 reaches its lowermost position illustrated in Fig. 2. This means, as best shown in Figs. 1 and 2, comprises a bracket 36 fixedly secured with respect to and forming a part of the work fixture. A longitudinal recess 37 is formed in the front face of the bracket 36 and is of such size as to receive the lower end of the member 32 when the latter reaches its lowermost position. The front of the recess 37 is covered by any suitable form of cover plate indicated fragmentarily in Figs. 1 and 2 at 38. The side edges of the lower end of the member 32 and the guide bars 35 are beveled slightly as shown at 39 in order to ensure that the lower end of the member 32 will enter the recess 37. This recess guides the lower end of the member 32 in proper alignment with respect to the workpiece which is held in the fixture. In some cases the mounting of the guide member 32 on the slide 13 may be sufficient to hold the member in proper alignment without the necessity of an auxiliary guiding bracket on the work fixture, but where, as in the present case, the guiding member 32 projects materially beyond its point of connection to the slide, such an auxiliary guiding means is desirable.

In Figs. 3 to 7, inclusive, is shown a special form of broach designed to cooperate with the guide bars 35. In the present case the broach chosen for illustration is one adapted to form a rectangular shaped opening from one which is initially circular, the initial circular opening 31 being shown in Fig. 8 and the finished rectangular opening 40 being shown in Fig. 9. The broach is provided throughout a portion of its length with a pair of oppositely disposed guiding grooves 42 adapted to receive the inner projecting edges of the guide bars 35. It will be apparent that the groove 42 could not extend throughout the entire length of the broach if it is desired to finish the entire internal periphery of the opening in a single broaching operation. However, there is provided, in accordance with the present invention, a broach which will finish the entire internal periphery of the opening and at the same time accommodate a guiding groove for a major portion of its length. As best shown in Fig. 3, the teeth on the broach fall into four principal groups. The first group of teeth, indicated at 43 and shown in section in Fig. 4, are circular in form and operate to finish the circular opening 31. This opening, it is assumed, is initially formed in the casting operation. When the teeth 43 bring the circular opening 31 up to a diameter equal to the minor diameter of the final rectangular opening 40, no further cutting on the center of the long side of the rectangular opening is desired and, therefore, the broach is provided thereafter with a second group of teeth 44, one of which is shown in section in Fig. 5 in which there is provided at each side of the broach a non-cutting flat 45. On each successive tooth of the second group 44, these non-cutting flat sides are of progressively increasing length beginning with a very small dimension on the first tooth of this group and gradually increasing until the cutting edges 46 of the second group of teeth cut out to the narrow sides of the rectangular opening 40. Thereafter, there is provided on the broach a third group of cutting teeth 47, one of which is shown in section in Fig. 6 in which similar non-cutting flat sides 48 are also provided at the ends of the teeth. In this group of teeth, all of the cutting is done at the corner portions 49 and these corner portions move outwardly on each succeeding tooth until on the final group of teeth 50 the opening is cut to final form by rectangularly formed finishing teeth shown in section in Fig. 7.

The guiding groove 42 in the broach may extend from the upper or trailing end of the broach down through all of the teeth having the flat non-cutting sides 45 until the flat cutting sides are so narrow that they do not equal or exceed the width of the groove. It will be noted, by reference to Figs. 1 and 2, that the maximum length of the guiding member 32 is limited by the distance between chuck 18 and the work fixture when the chuck 18 is in its lowermost position. In certain cases this distance may be shorter than that portion of the length of the broach which would accommodate the guiding groove 42, and in that case the groove would not have to extend as far as it does in the illustrated embodiment. It is apparent that it is of advantage to utilize a broaching machine in which the distance between the pull chuck 19 when it is in its upper position and the upper face of the work is as small as possible, because in that case the distance between the chuck 13 and the work fixture will be at its maximum.

It is possible in cases where a rectangular opening of the type illustrated in Fig. 9 is to be formed to so construct the broach that the groove as shown in Fig. 3 extends throughout a major portion of the limit of the tool. In the case of a broach for forming a square opening, a similar guide groove may also be provided for a substantial portion of the broach limit, although not as large a portion as in the case of a rectangular broach. It is apparent, however, that if the opening to be formed was circular in cross-section and it was necessary to finish the entire internal periphery of the opening that it would not be possible to form guiding grooves in the broach unless portions of the opening are finished in advance of others. The invention is therefore limited in its application to broaches for converting round to square or rectangular openings or to broaches in which it is not necessary to cut entirely around the periphery of the opening. Thus, in some cases a pull broach may be used to cut only on limited areas at opposite sides of the broach, in which event a guiding groove could be formed throughout the entire length of the broach.

While only one embodiment of the invention has been shown and described, it is apparent that others are avaliable within the spirit of the invention and within the scope of the appended claims.

What I claim is:

1. In a broaching machine, a work holding fixture, a movable tool holding chuck adapted to engage one end of a broaching tool and advance the other end of said tool through the work, broach guiding means fixed with respect to said movable chuck and adapted to engage the tool at a region in the cutting portion thereof, and means for engaging the opposite end of the broach after it is projected through the work by said chuck and operable after said chuck has completed its broach advancing movement to pull the remainder of the tool through the work while its trailing end is guided by said broach guiding means.

2. In a broaching machine, a work holding fixture, a movable tool holding chuck adapted to engage one end of a broaching tool and advance the other end of said tool through the work and thereafter remain stationary during the remaining broaching stroke of the tool, broach guiding means fixed with respect to said movable chuck and adapted to engage the tool at a region in the cutting portion which is in close proximity to the work when the chuck has completed said broach advancing movement, means for engaging the opposite end of the broach after it is projected through the work by said chuck and for pulling the remainder of the tool through the work while its trailing end is guided by said broach guiding means, and means fixed with respect to said work holding fixture for engaging said broach guiding means when it has completed the broach advancing movement with said chuck and for holding said guiding means in proper alignment with the work during the subsequent broaching movement of the tool.

3. In a broaching machine having a work holding fixture, a broaching tool, a movable tool holding chuck adapted to engage one end of said tool and advance the other end through the work, and means adapted to engage the opposite end of the tool after it is projected through the work by said movable chuck and to pull the remainder of the tool through the work; the combination of tool guiding means movable with said chuck, said broaching tool and guiding means having a tongue and groove guiding connection with each other at opposite sides of the broach in non-cutting areas thereon.

4. In a broaching machine having a work holding fixture, a broaching tool, a movable tool holding chuck adapted to engage one end of said tool and advance the other end through the work, and means adapted to engage the opposite end of the tool after it is projected through the work by said movable chuck and to pull the remainder of the tool through the work; the combination of tool guiding means movable with said chuck, said broaching tool and guiding means having a tongue and groove guiding connection with each other at opposite sides of the broach in non-cutting areas thereon, and means fixed with respect to said work holding fixture and engageable with said guiding means when said chuck and guiding means have advanced to hold the guiding means in proper alignment with the work during the broach pulling stroke.

5. In a broaching machine having a work holding fixture, a broaching tool, a movable tool holding chuck adapted to engage one end of said tool and advance the other end through the work, and means adapted to engage the opposite end of the tool after it is projected through the work by said movable chuck and to pull the remainder of the tool through the work; the combination of tool guiding means movable with said chuck and provided with a pair of inwardly directed parallel guide bars, said broach at non-cutting areas thereon having longitudinal grooves adapted to receive the inwardly projecting guide bars.

6. In a broaching machine, a work holding fixture, a movable tool holding chuck adapted to engage one end of a broaching tool and advance the other end through the work, an elongated broach guiding member fixed to and movable with said chuck and extending parallel to the path of movement of the broach, a pair of inwardly projecting guide bars secured to said member and adapted to engage in correspondingly shaped grooves on the broach, and means for engaging the opposite end of the broach after it is projected through the work by said chuck and for pulling the broach through the work while its trailing end is guided by said guide bars.

7. In a broaching machine, a work holding fixture, a slide adapted to advance toward and recede from said fixture, a tool holding chuck fixed to said slide and adapted to engage one end of a broaching tool and advance the other end through the work, an elongated broach guiding member fixed adjacent one end to said slide, said member being movable with said chuck and extending parallel to the path of movement of the broach toward said fixture, a pair of inwardly projecting guide bars secured to said member and adapted to engage in correspondingly shaped grooves on the broach, means for engaging the opposite end of the broach after it is projected through the work by said chuck and for pulling the broach through the work while its trailing end is guided by said guide bars, and means fixed with respect to said fixture and adapted to engage the free end of said member when the slide is advanced and hold said member in proper alignment with the work.

8. A broach for finishing an opening in a workpiece, said broach having an initial group of teeth adapted to finish areas located at opposite sides of said opening and a later group of teeth adapted to remove metal from only the remaining periphery of said opening, said broach being provided with a pair of grooves located in longitudinal alignment with the cutting edges of the teeth which finish said areas at opposite sides of the opening and located entirely beyond that portion of the length of the broach having said initial group of teeth, said grooves being adapted to cooperate with means for guiding the broach during its broaching stroke.

HARRY H. GOTBERG.